United States Patent
Moudry et al.

(10) Patent No.: US 9,286,930 B2
(45) Date of Patent: Mar. 15, 2016

(54) IN-SITU LAPPING PLATE MAPPING DEVICE

(71) Applicant: Seagate Technology LLC, Cupertino, CA (US)

(72) Inventors: Raymond Leroy Moudry, Bloomington, MN (US); Pramit Parikh, Eden Prairie, MN (US); Mark Allen Herendeen, Shakopee, MN (US); Joel W. Hoehn, Hudson, WI (US)

(73) Assignee: Seagate Technology LLC, Cupertino, CA (US)

( * ) Notice: Subject to any disclaimer, the term of this patent is extended or adjusted under 35 U.S.C. 154(b) by 266 days.

(21) Appl. No.: 14/018,027

(22) Filed: Sep. 4, 2013

(65) Prior Publication Data

US 2015/0062746 A1    Mar. 5, 2015

(51) Int. Cl.
| | |
|---|---|
| *G11B 21/21* | (2006.01) |
| *G11B 5/56* | (2006.01) |
| *G11B 7/08* | (2006.01) |
| *G11B 5/187* | (2006.01) |
| *G11B 5/60* | (2006.01) |

(52) U.S. Cl.
CPC ............... *G11B 7/08* (2013.01); *G11B 5/1871* (2013.01); *G11B 5/6005* (2013.01)

(58) Field of Classification Search
CPC ....... G11B 5/1871; G11B 5/6005; G11B 7/08
See application file for complete search history.

(56) References Cited

U.S. PATENT DOCUMENTS

| | | | | |
|---|---|---|---|---|
| 5,463,805 A * | 11/1995 | Mowry et al. | ............... | 29/603.09 |
| 5,527,110 A * | 6/1996 | Abraham et al. | ................ | 374/5 |
| 5,595,526 A * | 1/1997 | Yau et al. | ........................ | 451/8 |
| 5,632,669 A * | 5/1997 | Azarian et al. | .................. | 451/54 |
| 5,735,036 A * | 4/1998 | Barr et al. | .................. | 29/603.12 |
| 5,949,927 A * | 9/1999 | Tang | ............................... | 385/12 |
| 5,951,370 A * | 9/1999 | Cesna | ............................. | 451/21 |
| 5,975,994 A * | 11/1999 | Sandhu et al. | .................. | 451/56 |
| 5,997,381 A * | 12/1999 | Dee et al. | ........................... | 451/5 |
| 6,354,910 B1 * | 3/2002 | Adebanjo et al. | ............... | 451/21 |
| 6,684,171 B2 * | 1/2004 | Church et al. | ................ | 702/104 |
| 6,872,132 B2 * | 3/2005 | Elledge et al. | ................ | 451/521 |
| 7,014,530 B2 | 3/2006 | Kasiraj et al. | | |
| 7,024,268 B1 * | 4/2006 | Bennett et al. | ................ | 700/121 |
| 7,101,799 B2 * | 9/2006 | Paik | ................................. | 438/692 |
| 7,354,332 B2 * | 4/2008 | Surana et al. | ...................... | 451/5 |
| 7,788,796 B2 * | 9/2010 | Hsiao et al. | ................. | 29/603.16 |
| 7,861,400 B2 | 1/2011 | Lille | | |
| 7,899,571 B2 * | 3/2011 | Basim et al. | ................... | 700/121 |
| 7,914,362 B2 * | 3/2011 | Bunch et al. | ........................ | 451/5 |
| 8,047,894 B2 * | 11/2011 | Bunch et al. | ........................ | 451/5 |
| 8,351,162 B2 | 1/2013 | Etoh et al. | | |
| 8,390,962 B2 | 3/2013 | Gunder et al. | | |
| 8,453,317 B2 | 6/2013 | Allen et al. | | |
| 8,831,767 B2 * | 9/2014 | Lehman et al. | ............... | 700/164 |
| 2003/0181131 A1 * | 9/2003 | Lehman et al. | .................... | 451/5 |

(Continued)

FOREIGN PATENT DOCUMENTS

EP    0547894 B1    5/1996

*Primary Examiner* — Joseph J Hail
*Assistant Examiner* — Marc Carlson
(74) *Attorney, Agent, or Firm* — Hall Estill Attorneys at Law

(57) ABSTRACT

A device and associated method of use can have at least an object with a work surface that contacts a lapping surface of a tool. Topography of the lapping surface can be mapped in-situ by an adjacent sensor array and the topography stored in a memory. The sensor array may be configured with a plurality of sensors positioned on opposite sides of the object.

20 Claims, 4 Drawing Sheets

(56) References Cited

U.S. PATENT DOCUMENTS

| | | |
|---|---|---|
| 2006/0258264 A1* | 11/2006 | Eischeid et al. ............ 451/5 |
| 2007/0123149 A1* | 5/2007 | Bunch et al. ............... 451/5 |
| 2007/0158201 A1* | 7/2007 | Kollata et al. ............. 205/82 |
| 2009/0211081 A1 | 8/2009 | Boone, Jr. et al. |
| 2010/0035518 A1* | 2/2010 | Chang et al. .............. 451/6 |
| 2010/0129939 A1* | 5/2010 | David et al. ............... 438/8 |
| 2011/0256812 A1* | 10/2011 | Dhandapani et al. ....... 451/56 |
| 2013/0224890 A1* | 8/2013 | Xu et al. ................... 438/8 |

* cited by examiner

IN-SITU LAPPING PLATE MAPPING DEVICE

SUMMARY

Assorted embodiments provide a device constructed with at least an object with a work surface that contacts a lapping surface of a tool. Topography of the lapping surface can be mapped in-situ by an adjacent sensor array and the topography stored in a memory. The sensor array may be configured with a plurality of sensors positioned on opposite sides of the object.

DETAILED DESCRIPTION

Minimization of data retrieval and storage components has advanced the data storage capacity and data access speed of data storage devices. While smaller data components can increase data storage performance, manufacturing complexity can make fabrication precision difficult to achieve and maintain. A reduction in data storage component tolerance can correspond with increased fabrication time and waste as minute deviations in manufacturing equipment and environment can jeopardize the accuracy of the component. For example, deflection of component processing equipment under gravity and load can produce unwanted surface undulations that can degrade data storage performance, especially in reduced form factor data storage environments where spacing is on a nanometer scale.

Such manufacturing imprecision has rendered an object with a work surface that contacts a lapping surface of a tool while an adjacent sensor array maps a topography of the lapping surface in-situ with a plurality of sensors from the sensor array positioned on opposite sides of the object. The mapping of at least the lapping surface can be done proactively and retroactively to accommodate any deviations in environment and surface conditions to ensure a work surface flatness that is less than a predetermined planarity, such as 1 µm over 4 inches. Such a flat work surface can allow for reduced data storage component spacing that may provide greater data bit linear resolution and data bit access speeds.

Figure 1:
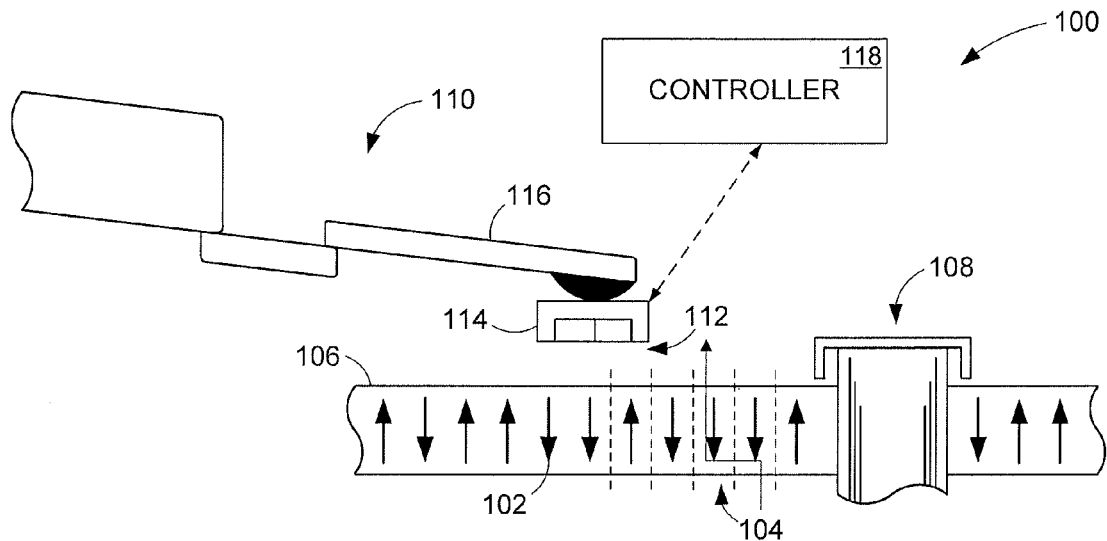
FIG. 1 is a block representation of a portion of an example data storage system configured in accordance with some embodiments.

While a work surface can encompass magnetically operational and non-operational materials, various embodiments construct the work surface at least in part as a data storage component having an air bearing surface (ABS) and capable of being employed in an unlimited variety of different data storage devices and environments. FIG. 1 generally illustrates a block representation of a portion of an example data storage device 100 in which a data component having a substantially flat work surface can be practiced in accordance with some embodiments. The data storage device 100 is configured with a plurality of magnetic data bits 102 arranged in data tracks 104 on a data medium 106 that is controlled by a centrally positioned spindle motor 108.

An actuating assembly 110 can be configured to float a predetermined distance above the data bits 102 and data medium 106 on an air bearing 112. The actuating assembly 110 can have at least one transducing head 114 suspended on an actuating arm 116 that allows one or more transducing means to pitch and roll to access selected data bits 102 and tracks 104. In this way, at least one local and remote controller 118 can dictate data access to and from the data medium 106 by spinning the spindle motor 108 and articulating the actuating arm 116. It should be noted that control of the data transducing assembly 110 can be conducted with a remote controller across a network via appropriate communications protocol, which can provide increased connectivity options and optimized data access for data storage environments like distributed data systems and cloud computing.

Figure 2:
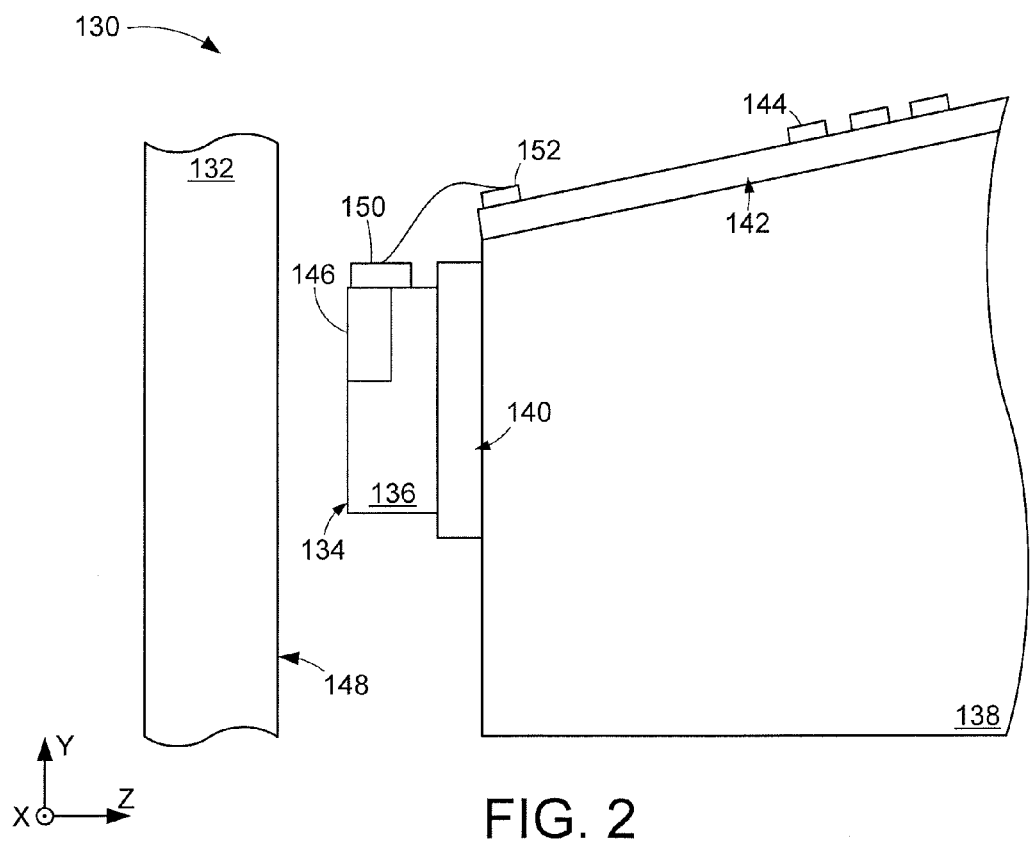
FIG. 2 shows a block representation of a portion of an example tooling assembly constructed and operated in accordance with assorted embodiments.

The implementation of a data component that has a substantially flat work surface, such as an ABS, can allow the air bearing 112 to be minimized by reducing the flight fluctuations of the transducing head 114 that can correspond with an undulating work surface. FIG. 2 displays a side view block representation of a portion of an example tooling assembly 130 that may be used in various embodiments to construct one or more components of the data storage device 100 of FIG. 1. The tooling assembly 130 can have at least one tool 132 that selectively engages portions of a work surface 134 to provide a predetermined smoothness.

As shown, the work surface 134 is a rowbar 136 that is secured to a carrier 138 by an adhesive 140. The carrier 138 houses a probe card 142 that allows structural and operational information from the tool 132 and work surface 134 to be read via contact with at least two electrical contacts 144. In accordance with various embodiments, the rowbar 136 comprises a plurality of separated transducing means 146, such as a magnetoresistive sensor and data writer. Through controlled articulation of the work surface 134 with respect to an abrasive tooling surface 148 of the tool 132, sidewalls of one or more transducing means 146 can be shaped to be substantially planar, which allows for more accurate subsequent manufacturing and data storage performance.

Although blind engagement of the rowbar 136 and tooling surface 148 can be practiced without any real-time transducing means 146 structural condition, such engagement can result in too little or too much of the transducing means 146 being removed and degraded data storage performance. Hence, the amount of material removed from at least one transducing means 146 is monitored in-situ by connecting a lapping guide pad 150 to a probe contact 152 on the probe card 142. It should be noted that a lapping guide is not required and any means can be used to monitor the size and shape of the transducing means 146.

The continuous or routine monitoring of the amount of material being removed from the transducing means 146 through contact with the abrasive tooling surface 148 can be used to reliably provide a substantially planar transducing sidewall when the tooling surface 148 is sufficiently flat compared to the designed planar tolerance of the transducing sidewall. That is, an amount of tooling surface 148 undulation can be inconsequential when the designed planar tolerance of the transducing sidewall is greater than the undulation. However, the progression of transducing means 146 towards smaller overall dimensions emphasizes the planarity of the transducing sidewalls and consequently the flatness of the tooling surface 148.

Figure 3:
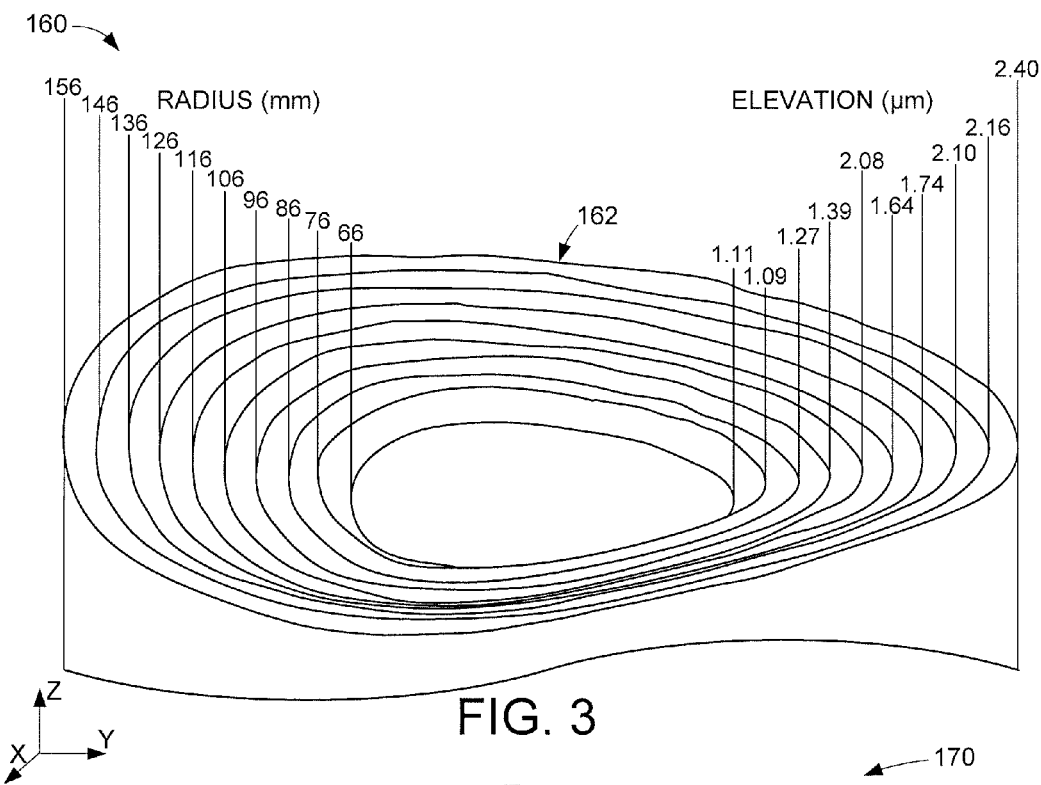
FIG. 3 displays a perspective view block representation of portions of an example lapping plate capable of being used in the tooling assembly of FIG. 2.

FIG. 3 generally illustrates a perspective view of an example lapping plate 160 that has an undulating tooling surface 162 configured with a predetermined amount of abrasive, such as 1-10 micron abrasive particles. The tooling surface 162 may be initially constructed and operated as a planar surface that forms the saddle shaped undulation shown in FIG. 3 through use and pressure during operation. The tooling surface 162 may alternatively be shaped with a predetermined amount of runout prior to an initial engagement with a work surface. That is, the tooling surface 162 may have continuous or discontinuous changes in elevation, as illustrated by micrometer values on the right side of FIG. 3, over different radii, as displayed by millimeter values on the left side of FIG. 3, that define a shape and runout at various points on the tooling surface 162.

In view of the runout of the undulating tooling surface 162 that increases in height over 1 micron across 90 mm, a plate following carrier can be used to compensate the average pitch of a rowbar in relation to the tooling surface 162. The resultant transducing means work surface can be flatter than the tooling surface 162, but the correction of the tooling surface 162 undulation is conducted leading and/or following the point of contact between the transducing means work surface and tooling surface 162, which can be imprecise for transducing sidewall planarity on a nanometer scale. While a completely flat tooling surface 148 is theoretically possible, time and cost expenses associated with providing and maintaining such a flat tooling surface 162 has evolved means for dealing with undulating tooling surfaces 162.

Figure 4:
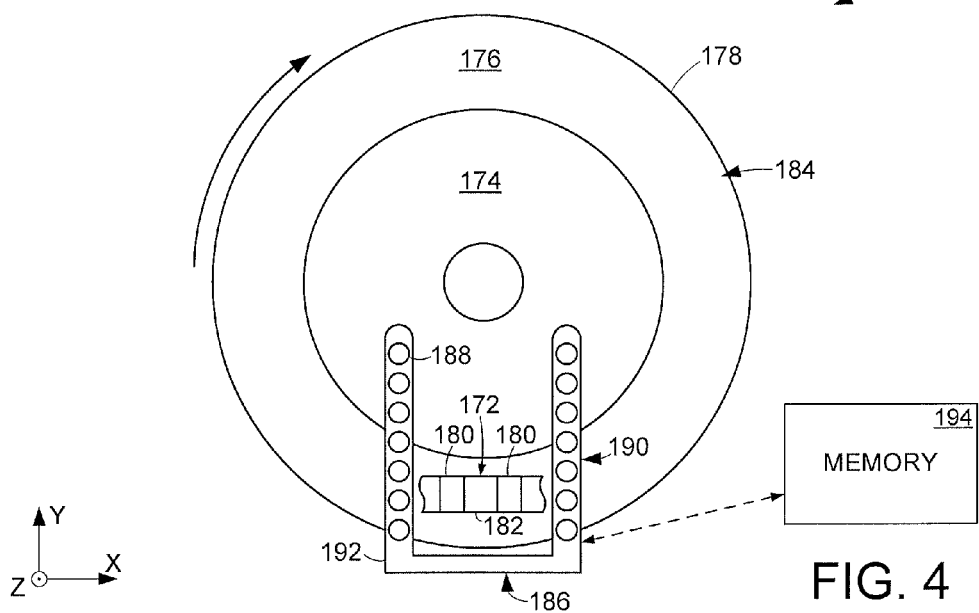
FIG. 4 illustrates a top view block representation of an example tooling system capable of being used with the lapping plate of FIG. 3 in assorted embodiments.

FIG. 4 provides a top view block representation of an example tooling system 170 operated in accordance with some embodiments, a work surface 172 faces one of a plurality of different abrasive surfaces 174 and 176 that respectively allow for rough and fine lapping with a single lapping plate 178 to produce a predetermined work surface 172 planarity for at least one transducing means 180 on the rowbar 182. In other words, the lapping plate 178 can be configured with any number and kinds of abrasives that can selectively engage the work surface 172 with a tooling surface 184 that is defined by a minimum average radius runout, such as 1 micron over 4 inches across any radius of the plate 178, and average circumferential runout, such as 3 micron over the circumference of the plate 178 or abrasive region 174 and 176.

Adjustment of the pitch, along the X axis, and roll, along the Y axis, can allow the work surface 172 to remain parallel with the tooling surface 184 while one, or both, surfaces oscillate. While pitch and roll adjustments can be conducted, reduced dimensions for the transducing means 180 along with tighter structural and operational tolerances can jeopardize the accuracy of the shaping of the work surface 172 to a predetermined planarity by lapping with an undulating tooling surface 184. As a non-limiting example, deflection of the lapping plate 178 under gravity and lapping load can correspond with increased runout locally and universally on the plate 178, which can be difficult to predict and compensate for during tooling 184 and work 172 surface contact.

Accordingly, an array 186 of at least two sensors 188 can be positioned predetermined distances from the rowbar 182 and lapping plate 178 to allow the topography of the plate 178 to be mapped. The active mapping of the tooling surface 184 in-situ provides real-time feedback about the condition of the various abrasive regions 174 and 176 so that precise adjustments can be made to maintain predetermined work 172 to tooling 184 surface contact that produces at least a minimum level of planarity in the work surface 172, such as less than a nanometer of elevation change over the length or width of the transducing means 180. Various embodiments can adjust at least the speed of the lapping plate 178, lapping load applied along the Z axis to the rowbar 182, rowbar pitch, rowbar roll, and rowbar twist about the Z axis to accommodate the feedback received from the sensor array 186.

While not required or limiting, the sensor array 186 can be configured, as displayed in FIG. 4, with parallel rows 190 extending an array frame 192 on opposite leading and trailing sides of the rowbar 182. The position of multiple sensors 188 along each parallel row 190 may allow for redundant sensing of the tooling surface 184 as well as concurrent mapping of multiple different abrasive regions 174 and 176. Assorted embodiments construct the sensor array 186 with at least one inductive sensor 188 while other embodiments use inductive sensors exclusively in each row 190.

The use of inductive sensors 188 may be complemented, in some embodiments, by optical, force, and proximity sensors that monitor the structural and operational conditions of the lapping plate 178 and rowbar 182 while returning the data to a control system capable of logging the conditions and rendering a topographical map of some or all of the tooling surface 184. It is contemplated that the control system has one or more local and remote controllers, processors, and data logging devices that allows the mapping of the tooling surface 184 from the sensors 188 and the map data to be stored in a memory 194.

Various embodiments utilize the topographical map data stored in the memory 194 in comparisons with ideal, model, past, and predicted tooling surface 184 topographies that may be inputted and rendered by the control system. Such a control system may be configured to sense unexpected tooling surface 184 conditions, like trauma, cracks, pits, and loss of abrasiveness, which can function in concert with the tooling surface 184 topography to change or halt lapping operations on the rowbar 183. For instance, the sensing of a surface crack may reduce the lapping plate 178 speed, move the rowbar 182 to a different circumferential path on the plate 178, change abrasive regions, suspend tooling surface 184 rotation, and terminate tooling 184 and work 172 surface contact depending on the size, severity, and predicted performance of the sensed surface crack.

With the array frame 192 continuously extending from the leading to trailing side of the rowbar 182, the opportunity exists for sensors 188 to be positioned laterally along the X axis proximal the rowbar 182. The position of sensors 188 on opposite leading and trailing sides of the rowbar 182 allows for proactive and retroactive mapping of the tooling surface 184 while sensors 188 placed between the leading and trailing surfaces may convey environmental, pressure, and topographical data associated with the abrasive regions 174 and 176 as well as the rowbar 182.

Figure 5:
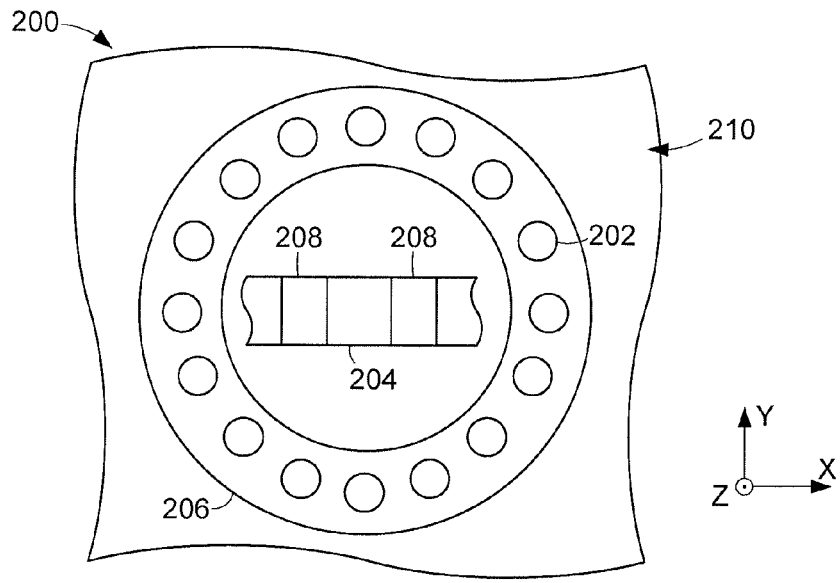
FIG. 5 is a top view block representation of a portion of an example tooling system constructed and operated in accordance with various embodiments.

FIG. 5 illustrates a top view block representation of a portion of an example tooling system 200 configured in accordance with assorted embodiments to have sensors 202 positioned radially about the rowbar 204. A substantially circular or elliptically shaped array frame 206 may be physically connected to the rowbar 204 to maintain a predetermined separation distance between each sensor 202 and the transducing means 208 present on the rowbar 204. Such a physical connection can be useful with the vibration and movement that can be experienced during rowbar 204 contact with the lapping plate 210.

However, physical separation of the rowbar 204 and array frame 206 may alternatively be practiced to allow the sensors 202 to be unaffected by rowbar 204 behavior. A non-limiting embodiment utilizes the curvilinear array frame 206 to position alternating optical and inductive sensors about the rowbar 204 that can simultaneously map the tooling surface 210 topography and rowbar 204 orientation relative to the tooling surface 210. The use of inductive sensors may further detect changes in rowbar 204 performance, such as location in an abrasive region and bending in relation to the tooling surface 210. It can be appreciated that the various sensor 202 mounting locations in the array frame 206 may remain empty or be filled by any variety of sensing equipment, such as environmental sensors.

Figure 6:
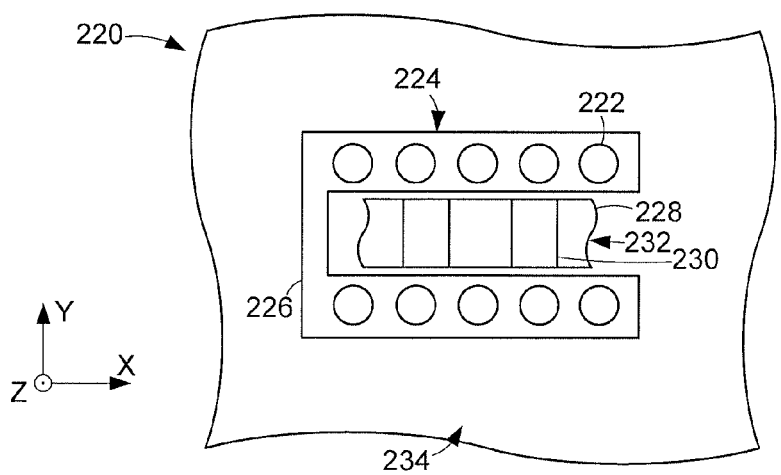
FIG. 6 shows a top view block representation of an example portion of a tooling system operated in accordance with some embodiments.

FIG. 6 is a top view block representation of another example tooling system 220 configured with a plurality of sensors 222 arranged along parallel rows 224 of an array frame 226. The respective parallel rows 224 are located on opposite longitudinal sides of a rowbar 228 that comprises multiple transducing means 230 as part of a work surface 232 that contacts the tooling surface 234 of a lapping plate to shape the work surface 232 to have a predetermined planarity. By positioning the sensors 222 along the longitudinal sides of the rowbar 228 and extending each row 224 from the leading side of the rowbar 228 to the trailing side along the X axis, a real-time tooling surface 234 topography can be mapped at the point of contact between the work 232 and tooling 234 surfaces.

While no sensors 222 are positioned directly in front or behind the rowbar 228, in contrast to the sensor configurations of FIGS. 4 and 5, extension of the respective rows 224 allows sensors 222 to be located ahead or behind the rowbar 228 as the tooling surface 234 moves in the X-Y plane. The lack of sensors 222 at the leading and trailing sides of the rowbar 228 do not necessarily preempt the sensors 222 of the respective rows 224 from mapping the topography of the leading and trailing sides of the rowbar 228. It should be noted that the terms leading and trailing are herein meant as regions of the tooling surface 234 that are imminently going to engage the work surface 232 or have recently engaged the work surface 232.

Figure 7:
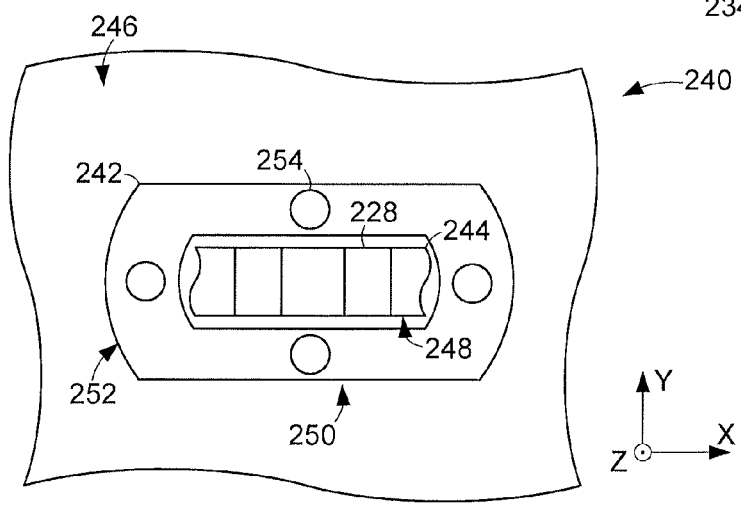
FIG. 7 displays a top view block representation of a portion of an example tooling system configured in accordance with assorted embodiments.
Figure 8:
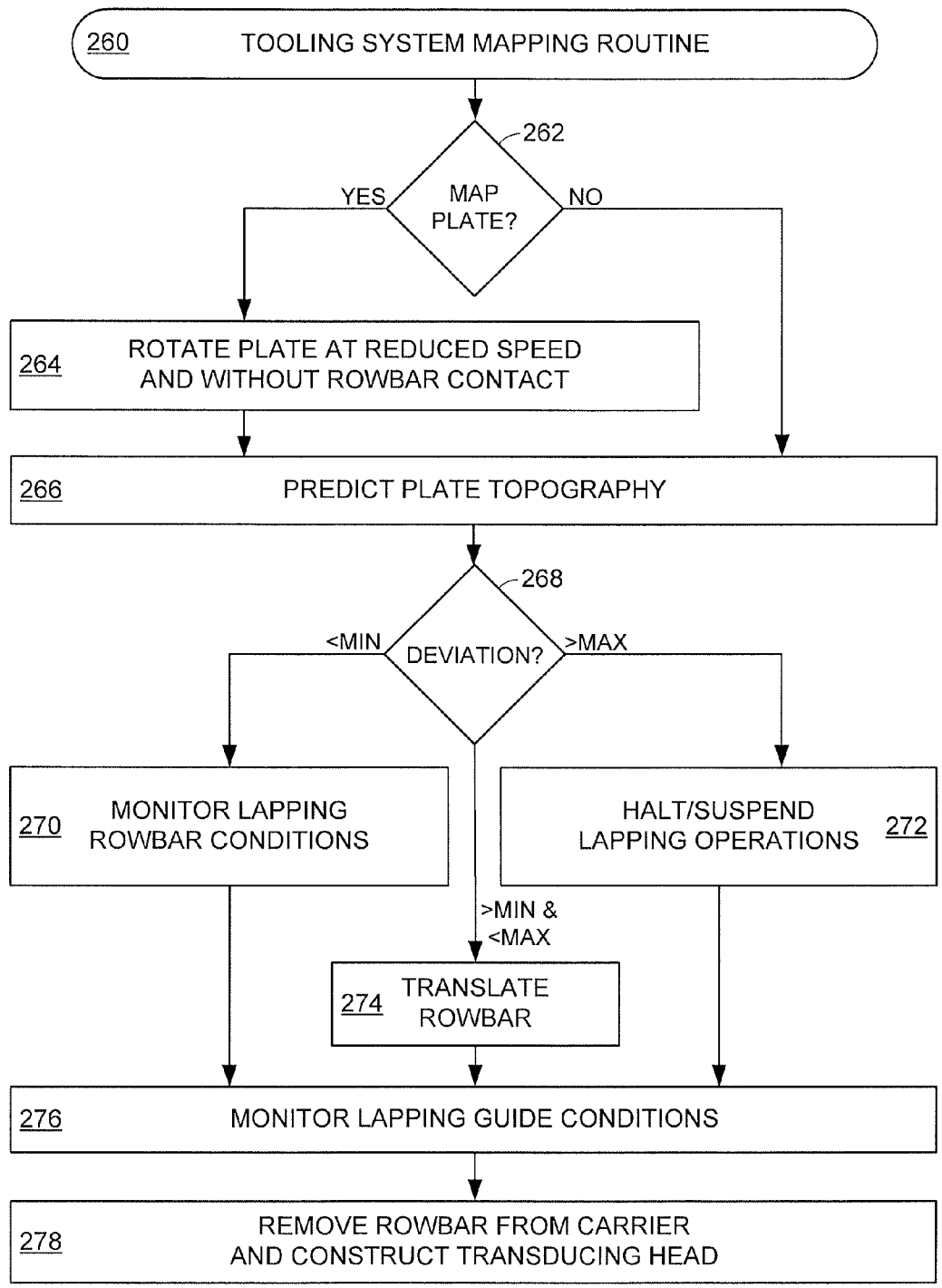
FIG. 8 provides a flowchart of a data reader fabrication routine carried out in accordance with various embodiments.

FIG. 7 shows a top view block representation of another example tooling system 240 constructed and operated in accordance with assorted embodiments to have an array frame 242 surround a rowbar 244 that has multiple transducing means 246 in contact with a tooling surface 246 as part of a work surface 248. The array frame 242 has both linear rows 250 and curvilinear ends 252 that allow sensors 254 to be positioned in close proximity to the leading, trailing, and longitudinal sides of the rowbar 244. In contrast to the exclusively linear or curvilinear array frames of FIGS. 4-6, the combination of linear and curvilinear frame portions can minimize the separation distance between the work surface 248 and the sensors 254, which can optimize the detection of rowbar 244 orientation changes and tooling surface 246 topography mapping.

Regardless of the number, type, and position of sensors in a sensor array, the example tooling system mapping routine 260 can be conducted in accordance with assorted embodiments. The routine 260 initially can determine if a lapping plate is to be mapped in decision 262. The mapping of a lapping plate can be conducted in any variety of manners, but in some embodiments the plate is rotated in step 264 at a non-operational reduced speed without any rowbar contact with a tooling surface of the lapping plate. The mapping of the lapping plate at a reduced speed and without rowbar contact can allow for precise and potentially redundant passes over various portions of the plate to ensure the runout for some or all of the tooling surface of the plate is accurately mapped.

At the conclusion of step 264 or if no mapping is to be conducted prior to rowbar engagement with the lapping plate, step 266 will predict the lapping plate topography during operation. The prediction of step 266 may employ model data, logged performance data, and algorithms to forecast how the lapping plate should behave under a lapping load, bending stress, and normal wear during tooling surface contact with a work surface of a rowbar. Next, at least one rowbar contacts the lapping plate while decision 268 continuously, routinely, or sporadically maps the tooling surface of the lapping plate with sensors of a sensing array for deviation from the predicted surface topography from step 266.

In the event decision 268 finds a deviation from the predicted model that is less than a minimum deviation threshold, such as runout of greater than 1 micron over 1 inch, step 270 continues to monitor lapping rowbar conditions, which may include returning to decision 268. A finding in decision 268 that a deviation that is greater than a maximum deviation threshold, such a 2 micron over 1 inch, step 272 can halt or suspend lapping operations and may disconnect the rowbar from the lapping plate so that the tooling surface can be reworked or replaced. When decision 268 discovers a deviation from the predicted topography that is between the predetermined minimum and maximum threshold, step 274 translates the rowbar with pitch and roll adjustments to maintain a parallel relationship between the work surface of the rowbar and the tooling surface of the lapping plate.

During or after performance of decision 268 and the resultant steps 270, 272, and 274, step 276 can monitor lapping guide conditions for at least one transducing means on at least one rowbar. That is, while material from the work surface is being removed via contact with the tooling surface of the lapping plate or during a period of non-contact between the rowbar and plate, a lapping guide (ELG) from a transducing means can be electronically connected and monitored by step 276 to determine how much material has been and is to be removed via contact with the lapping plate. Once the lapping guide indicates a predetermined amount of material has been removed, which corresponds with a predetermined surface planarity for the transducing means, step 278 removes the rowbar from the carrier and continues to construct a transducing head.

It should be noted that the transducing means configured in routine 260 is not limited to a particular type and can be any kind of magnetically sensitive lamination, such as abutted junction, trilayer, and spin valves. Likewise, step 278 is not limited in how the rowbar is handled to construct a transducing head. For instance, the rowbar may be further formatted with air bearing surface configuration like diamond like carbon (DLC) coating a surface of the transducing means. As such, the steps and decisions of routine 260 are not required or limiting, as shown, and can be modified, moved, removed, and added to at any time.

Through the mapping of a lapping plate in-situ, the planarity of a work surface and at least one constituent transducing means can be optimized by adapting to undulating tooling surface topography. The ability to compare actual tooling surface topography with predicted models allows for precise rowbar adjustment to optimize material removal and provide a predetermined work surface planarity defined by a runout of less than a predetermined threshold, such as 1 nanometer of elevation over a nanometer of surface space. Moreover, the in-situ mapping of a tooling surface allows unexpected deviations in operating conditions like surface cracks and rowbar bending to be compensated for through a myriad of different corrective measures that may involve stopping lapping operations, changing lapping pressure, and adjusting plate rotation.

It should be noted while the embodiments have been directed to apparatus and associated method of fabricating a magnetic sensor, the various embodiments can readily be utilized in any number of other applications, including fabricating a data writing device. Furthermore, it is to be understood that even though numerous characteristics and configurations of assorted embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed.

What is claimed is:

1. An apparatus comprising a rowbar having a work surface contacting a lapping surface of a tool, a topography of the lapping surface mapped in-situ by an adjacent sensor array and the topography stored in a memory, the sensor array comprising first, second, and third sensors that are respectively different sensor types, the first and second sensors positioned on opposite sides of the rowbar, the first sensor configured to monitor the rowbar, the second sensor configured to monitor the lapping surface, and the third sensor attached to the rowbar with a lapping guide pad.

2. The apparatus of claim 1, wherein the sensor array comprises at least one inductive sensor.

3. The apparatus of claim 1, wherein the sensor array comprises at least one optical sensor.

4. The apparatus of claim 1, wherein the plurality of sensors are positioned on opposite sides of the tool by a continuous array frame.

5. The apparatus of claim 1, wherein the work surface has an undulating surface prior to contact with the lapping surface.

6. The apparatus of claim 1, wherein the lapping surface has a non-flat shape.

7. The apparatus of claim 6, wherein the non-flat shape comprises a saddle.

8. The apparatus of claim 1, wherein the work surface comprises a plurality of transducing means.

9. The apparatus of claim 8, wherein the lapping surface concurrently contacts the plurality of transducing means.

10. A method comprising:
    contacting a work surface of a rowbar with a lapping surface of a tool;
    mapping a topography of the lapping surface in-situ by a first sensor positioned on a first side of the rowbar;
    monitoring the work surface of the rowbar with second and third sensors, the second sensor positioned on a second side of the rowbar, opposite the first side, the third sensor attached to the rowbar via a lapping guide pad, the first, second, and third sensors being different types of sensors; and
    storing the topography in a memory.

11. The method of claim 10, wherein the work surface is adjusted for a pitch and roll to maintain a parallel relationship between the work and lapping surfaces in response to the mapped topography.

12. The method of claim 10, wherein the distance between the work and lapping surfaces is measured during the mapping step.

13. The method of claim 10, wherein the lapping surface is disengaged from the work surface in response to the mapping step identifying a deformation in the lapping surface.

14. The method of claim 10, wherein the first and second sensors concurrently map the lapping and work surfaces.

15. The method of claim 10, wherein the first sensor array concurrently maps multiple different portions of the lapping surface corresponding to different abrasive regions.

16. The method of claim 10, wherein the mapped topography is compared to a predicted lapping model.

17. The method of claim 16, wherein the predicted lapping model is computed from the topography of the lapping surface being mapped prior to contact with the work surface.

18. The method of claim 10, wherein a lapping plate pressure is adjusted in response to the mapping and monitoring steps.

19. A method comprising:
    contacting a work surface of a rowbar with a lapping surface of a tool;
    mapping a topography of the lapping surface in-situ by an inductive sensor positioned on a first side of the rowbar;
    monitoring the work surface of the rowbar with an environmental sensor positioned on a second side of the rowbar, opposite the first side, and with a lapping guide sensor attached to the rowbar via a lapping guide pad;
    storing the topography in a memory; and
    adjusting the work surface in response to the mapped topography and the monitored work surface.

20. The method of claim 19, wherein the work surface is tilted to maintain a parallel orientation to the lapping surface.

* * * * *